US012761410B2

(12) United States Patent
Yang et al.

(10) Patent No.: US 12,761,410 B2
(45) Date of Patent: Oct. 13, 2026

(54) METALLIZED HIGH-INDEX BLAZE GRATING INCOUPLER

(71) Applicant: Applied Materials, Inc., Santa Clara, CA (US)

(72) Inventors: Jianji Yang, Cupertino, CA (US); Samarth Bhargava, Saratoga, CA (US); David Sell, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 432 days.

(21) Appl. No.: 17/949,526

(22) Filed: Sep. 21, 2022

(65) Prior Publication Data

US 2023/0120539 A1 Apr. 20, 2023

Related U.S. Application Data

(60) Provisional application No. 63/256,068, filed on Oct. 15, 2021.

(51) Int. Cl.
*G02B 5/18* (2006.01)
*F21V 8/00* (2006.01)
(Continued)

(52) U.S. Cl.
CPC ............ *G02B 5/1857* (2013.01); *G02B 1/12* (2013.01); *G02B 5/1819* (2013.01);
(Continued)

(58) Field of Classification Search
CPC ...... G02B 5/1857; G02B 1/12; G02B 5/1819; G02B 6/34; G02B 27/0172; G02B 2027/0178; G02B 6/0013; G02B 6/0033; G02B 6/0035; G02B 6/0036; G02B 6/0038; G02B 6/0063; G02B 6/0065; G02B 6/0066; G02B 6/0068; G02B 6/0073; G02B 2006/12061; G02B 2006/12038; G02B 2006/12057; G02B 2006/12147; G02B 6/1223; G02B 5/18; G02B 5/1842
See application file for complete search history.

(56) References Cited

U.S. PATENT DOCUMENTS 6,579,477 B1 6/2003 Belleville et al.
6,958,859 B2 10/2005 Hoose et al.
(Continued)

FOREIGN PATENT DOCUMENTS

CN 110133780 A 8/2019
DE 19652563 A1 * 6/1998 ............... G01D 5/38
(Continued)

OTHER PUBLICATIONS

English translation of DE-19652563-A1 (Year: 1998).*
(Continued)

*Primary Examiner* — Uyen Chau N Le
*Assistant Examiner* — Darby M. Thomason
(74) *Attorney, Agent, or Firm* — Patterson + Sheridan, LLP

(57) ABSTRACT

Certain embodiments described herein provide a waveguide including a plurality of blazed structures. The plurality of blazed structures include a grating material layer with a grating material having a refractive index greater than or equal to 2.0, and a metallic coating formed on a patterned surface of the grating material layer.

18 Claims, 8 Drawing Sheets

(51) Int. Cl.

| | |
|---|---|
| ***G02B 1/12*** | (2006.01) |
| ***G02B 6/122*** | (2006.01) |
| ***G02B 6/34*** | (2006.01) |
| *G02B 6/12* | (2006.01) |
| *G02B 27/01* | (2006.01) |

(52) U.S. Cl.

CPC ......... *G02B 6/0013* (2013.01); *G02B 6/0033* (2013.01); *G02B 6/0065* (2013.01); *G02B 6/0066* (2013.01); *G02B 6/1223* (2013.01); *G02B 6/34* (2013.01); *G02B 5/18* (2013.01); *G02B 5/1842* (2013.01); *G02B 5/1861* (2013.01); *G02B 5/1866* (2013.01); *G02B 6/0035* (2013.01); *G02B 6/0036* (2013.01); *G02B 6/0038* (2013.01); *G02B 6/0068* (2013.01); *G02B 6/0073* (2013.01); *G02B 2006/12038* (2013.01); *G02B 2006/12057* (2013.01); *G02B 2006/12061* (2013.01); *G02B 2006/12147* (2013.01); *G02B 27/0172* (2013.01); *G02B 2027/0178* (2013.01)

(56) References Cited

U.S. PATENT DOCUMENTS

| | | | | |
|---|---|---|---|---|
| 9,625,717 | B2 | 4/2017 | Sunnari et al. | |
| 11,604,363 | B2 * | 3/2023 | Damghanian | H10F 39/806 |
| 2003/0190473 | A1 * | 10/2003 | Argoitia | G02B 5/1861 428/402 |
| 2004/0197527 | A1 * | 10/2004 | Maula | C23C 16/45555 428/172 |
| 2005/0275944 | A1 * | 12/2005 | Wang | G02F 1/13363 359/578 |
| 2006/0001972 | A1 * | 1/2006 | Sato | G02B 5/1857 359/569 |
| 2006/0050391 | A1 * | 3/2006 | Backlund | G02B 5/1847 359/569 |
| 2007/0081246 | A1 * | 4/2007 | Stuck | B42D 25/29 359/568 |
| 2007/0098959 | A1 * | 5/2007 | Lieberman | B41F 31/002 428/172 |
| 2007/0121210 | A1 * | 5/2007 | Sato | G02F 1/133371 359/569 |
| 2009/0180186 | A1 * | 7/2009 | Ando | G02B 1/111 359/566 |
| 2010/0053611 | A1 * | 3/2010 | Padmore | G21K 1/062 427/523 |
| 2012/0120493 | A1 | 5/2012 | Simmonds et al. | |
| 2015/0171373 | A1 * | 6/2015 | Hirasawa | H10K 50/854 257/40 |
| 2015/0253570 | A1 | 9/2015 | Sunnari et al. | |
| 2016/0308020 | A1 * | 10/2016 | Sreenivasan | H01L 21/30604 |
| 2017/0363789 | A1 * | 12/2017 | Stalder | G02B 5/282 |
| 2018/0052501 | A1 * | 2/2018 | Jones, Jr. | G02B 6/0016 |
| 2018/0348429 | A1 | 12/2018 | Young et al. | |
| 2019/0162972 | A1 | 5/2019 | Ko | |
| 2020/0141802 | A1 | 5/2020 | Fu et al. | |
| 2020/0192031 | A1 | 6/2020 | Evans et al. | |
| 2021/0033867 | A1 * | 2/2021 | Luo | G02B 27/0172 |
| 2021/0055460 | A1 | 2/2021 | Lee et al. | |
| 2021/0072437 | A1 * | 3/2021 | Singh | G02B 27/0172 |
| 2021/0191040 | A1 | 6/2021 | Lee et al. | |
| 2022/0139103 | A1 * | 5/2022 | Zhang | G06V 40/1318 382/124 |

FOREIGN PATENT DOCUMENTS

| | | | | |
|---|---|---|---|---|
| FR | 2942549 | A1 * | 8/2010 | G02B 5/1861 |
| JP | 2002517343 | A | 6/2002 | |
| JP | 2015534117 | A | 11/2015 | |
| TW | 202101034 | A | 1/2021 | |
| WO | 9964901 | A1 | 12/1999 | |
| WO | 2014044912 | A1 | 3/2014 | |
| WO | 2016031712 | A1 | 3/2016 | |
| WO | 2017-189287 | A1 | 11/2017 | |
| WO | 2020131783 | A1 | 6/2020 | |
| WO | 2021050924 | A1 | 3/2021 | |

OTHER PUBLICATIONS

English translation of FR-2942549-A1 (Year: 2010).*

Calcines et al., Design of freeform diffraction gratings: Performance, limitations and potential applications; Proceedings of the Advances in Optical and Mechanical Technologies for Telescopes and Instrumentation III; Austin, TX, USA. Jun. 10-15, 2018; pp. 1431-1443. (Year: 2018).*

Sabushimike B., Horugavye G., Habraken S. Optimization of a multiblaze grating in reflection using a free-form profile. Appl. Opt. 2018;57:5048-5056. doi: 10.1364/AO.57.005048. (Year: 2018).*

International Search Report and Written Opinion for International Application No. PCT/US2022/044319 dated Jan. 20, 2023.

Office Action for Japanese Application No. 2024-521268 dated Mar. 4, 2025.

Office Action for Korean Application No. 10-2024-7015501 dated Nov. 2, 2025.

Extended European Search Report for European Application No. 22881546.0 dated Sep. 30, 2025.

Anon.: "Indium tin oxide", Wikipedia, Aug. 9, 2025 (Aug. 8, 2025), XP093303714, Retrieved from the Internet: URL: https://en.wikipedia.org/wiki/Indium_tin_oxide.

Anon.: "Indium tin oxide", Wikipedia, Aug. 9, 2025 (Aug. 9, 2025), XP093303714, Retrieved from the Internet: URL: https://en.wikipedia.org/wiki/Indium_tin_oxide.

Office Action for Japanese Application No. 2024-521268 dated Jan. 6, 2026.

Office Action from Taiwanese Patent Application No. 111137930, dated Jun. 10, 2026.

* cited by examiner

METALLIZED HIGH-INDEX BLAZE GRATING INCOUPLER

CROSS-REFERENCE TO RELATED APPLICATIONS

This application claims the benefit of U.S. Provisional Patent Application Ser. No. 63/256,068, filed Oct. 15, 2021, which is incorporated by reference herein in its entirety.

TECHNICAL FIELD

Embodiments of the present disclosure generally relate to a method and, more specifically, to a method of forming a plurality of gratings.

BACKGROUND

Virtual reality is generally considered to be a computer generated simulated environment in which a user has an apparent physical presence. A virtual reality experience can be generated in three dimensions (3D) and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of incoupling, such as audio and haptic incouplings, as well as virtual images, graphics, and video that enhances or augments the environment that the user experiences.

A virtual image is overlaid on an ambient environment to provide an augmented reality experience to the user. Waveguides are used to assist in overlaying images. Generated light is propagated through a waveguide until the light exits the waveguide and is overlaid on the ambient environment. In some designs, multiple waveguides are stacked or otherwise combined to form an optical device, such as a display lens. Each waveguide or waveguide combiner includes substrates with different grating regions.

Some of the challenges of waveguide display with current grating designs and known materials, include low optical efficiency, stray light, ghost images, and a small Field of View (FOV). In addition, manufacturing current gratings on the same substrate can be a time-consuming process.

Therefore, there is a need for improved grating designs and methods for manufacturing improved grating designs.

SUMMARY

Embodiments of the present disclosure generally relate to a method and, more specifically, to a method of forming a plurality of gratings.

In one aspect, a waveguide is provided. The waveguide includes a plurality of blazed structures. The plurality of blazed structures includes a grating material layer comprising a grating material having a refractive index greater than or equal to 2.0. The plurality of blazed structures further include a metallic coating formed on a patterned surface of the grating material layer.

Embodiments can include one or more of the following. The grating material is selected from germanium, silicon, silicon carbide (SiC), titanium oxide ($TiO_x$), $TiO_x$ nanomaterials, titanium dioxide ($TiO_2$), tantalum pentoxide ($Ta_2O_5$), silicon nitride $Si_3N_4$, silicon-rich ($Si_3N_4$), hydrogen-doped $Si_3N_4$, boron-doped $Si_3N_4$, hafnium oxide ($HfO_2$), scandium oxide ($Sc_2O_3$), niobium oxide ($NbO_x$), niobium oxide ($Nb_2O_5$), or a combination thereof. The metallic coating consists of transparent conducting materials (e.g., indium-tin-oxide (ITO), fluorine doped tin oxide (FTO), or doped zinc oxide), silver, aluminum, gold, or a combination thereof. The metallic coating conformally coats the grating material layer. The metallic coating forms a blanket coating on the grating material layer. At least one of the plurality of blazed structures has a first blazed surface that forms a blaze angle from about 50 degrees to about 80 degrees relative to perpendicular. The at least one of the plurality of blazed structures further has a second blazed surface opposite the first blazed surface and the second blazed surface forms a blaze angle from about 0 degrees to about 40 degrees from perpendicular. The waveguide further includes a microdisplay positioned adjacent a bottom surface of the grating material layer, wherein the bottom surface is opposite the patterned surface.

In another aspect, a method of forming a waveguide is provided. The method includes depositing a layer of a grating material having a refractive index greater than or equal to 2.0. The method further includes patterning the layer of the grating material to form a patterned surface comprising a first blazed surface having a first blaze angle and a second blazed surface having a second blaze angle. The method further includes depositing a metallic coating consisting of a metal on the patterned surface.

Embodiments can include one or more of the following. The grating material is selected from germanium, silicon, silicon carbide (SiC), titanium oxide ($TiO_x$), $TiO_x$ nanomaterials, titanium dioxide ($TiO_2$), tantalum pentoxide ($Ta_2O_5$), silicon nitride $Si_3N_4$, silicon-rich ($Si_3N_4$), hydrogen-doped $Si_3N_4$, boron-doped $Si_3N_4$, hafnium oxide ($HfO_2$), scandium oxide ($Sc_2O_3$), niobium oxide ($NbO_x$), niobium oxide ($Nb_2O_5$), or a combination thereof. The metallic coating consists of transparent conducting materials (e.g., indium-tin-oxide (ITO), fluorine doped tin oxide (FTO), or doped zinc oxide), silver, aluminum, gold, or a combination thereof. Patterning the layer of the grating material includes performing a nanoimprint process. The nanoim print process includes depositing a resist on the layer of the grating material; patterning the resist to expose portions of the grating material; and etching through the exposed portions of the grating material. Etching through the exposed portions of the grating material comprises directing an ion beam incident on the exposed portions of the grating material. Patterning the layer of the grating material comprises performing a photolithography process. Depositing the layer of the grating material comprises a physical vapor deposition (PVD) process, a chemical vapor deposition (CVD) process, a plasma enhanced chemical vapor deposition (PECVD) process, an atomic layer deposition (ALD) process, an inkjet printing process, or a three-dimensional (3D) printing process.

In yet another aspect, a method of forming a waveguide is provided. The method includes patterning a substrate to form a patterned surface comprising a first blazed surface having a first blaze angle and a second blazed surface having a second blaze angle. The method further includes depositing a metallic coating on the patterned surface.

Embodiments can include one or more of the following. The substrate includes a material selected from silicon (Si), silicon dioxide ($SiO_2$), germanium (Ge), silicon germanium (SiGe), sapphire, high-index transparent materials such as high-refractive-index glass, or a combination thereof. The metallic coating consists of transparent conducting materials (e.g., indium-tin-oxide (ITO), fluorine doped tin oxide (FTO), or doped zinc oxide), silver, aluminum, gold, or a combination thereof. Patterning the substrate includes performing a nanoimprint process.

In another aspect, a non-transitory computer readable medium has stored thereon instructions, which, when executed by a processor, causes the process to perform operations of the above apparatus and/or method.

BRIEF DESCRIPTION OF THE DRAWINGS

So that the manner in which the above recited features of the present disclosure can be understood in detail, a more particular description of the embodiments, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to a method and, more specifically, to a method of forming a plurality of gratings. Certain details are set forth in the following description and in FIGS. 1-5D to provide a thorough understanding of various embodiments of the disclosure. Other details describing well-known structures and systems often associated with waveguide displays and gratings are not set forth in the following disclosure to avoid unnecessarily obscuring the description of the various embodiments.

Many of the details, dimensions, angles and other features shown in the Figures are merely illustrative of particular embodiments. Accordingly, other embodiments can have other details, components, dimensions, angles and features without departing from the spirit or scope of the present disclosure. In addition, further embodiments of the disclosure can be practiced without several of the details described below.

Diffractive waveguide displays utilize gratings to couple light into the waveguide. Typically, these gratings are based on patterned low-index (e.g., $n<2.0$) polymer materials. The main challenges of waveguide display using current designs and materials include low optical efficiency, stray light, ghost image, and small Field of View (FOV). In some embodiments of the present disclosure which can be combined with other embodiments, metal-coated high-index material ($n>=2.0$) blazed gratings are provided. These metal-coated high-index material blazed gratings can be used as, for example, an input coupling grating, with high incoupling efficiency and high image quality of waveguide display, which can be quantified by measurement of optical efficiency, stray light, and ghost image. As such, back-diffraction of light towards the light engine, as a possible origin of stray light and ghost image, can be substantially lowered. In addition, these metal-coated high-index material blazed gratings can improve optical efficiencies for large incident angles, so that the FOV can be enlarged as well.

Figure 1A:
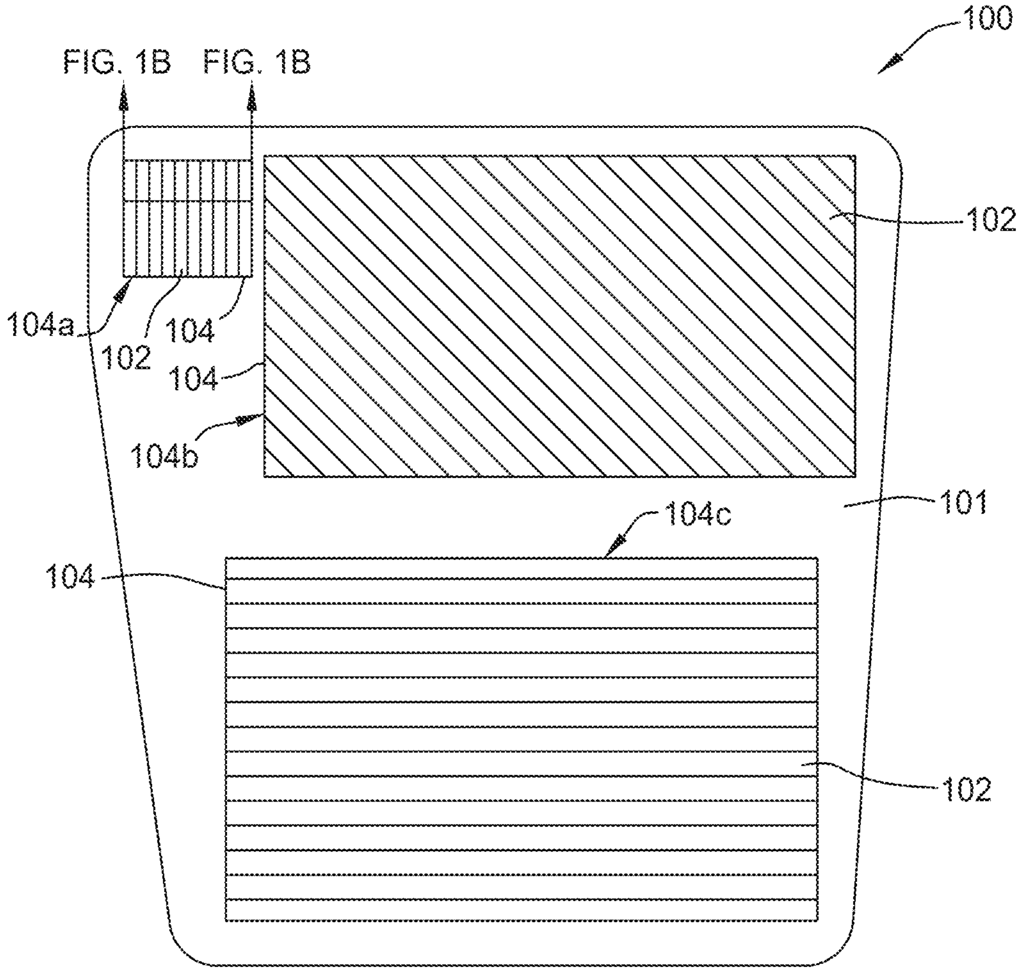
FIG. 1A illustrates a perspective, frontal view of a waveguide combiner according to one or more embodiments of the present disclosure.
Figure 1B:
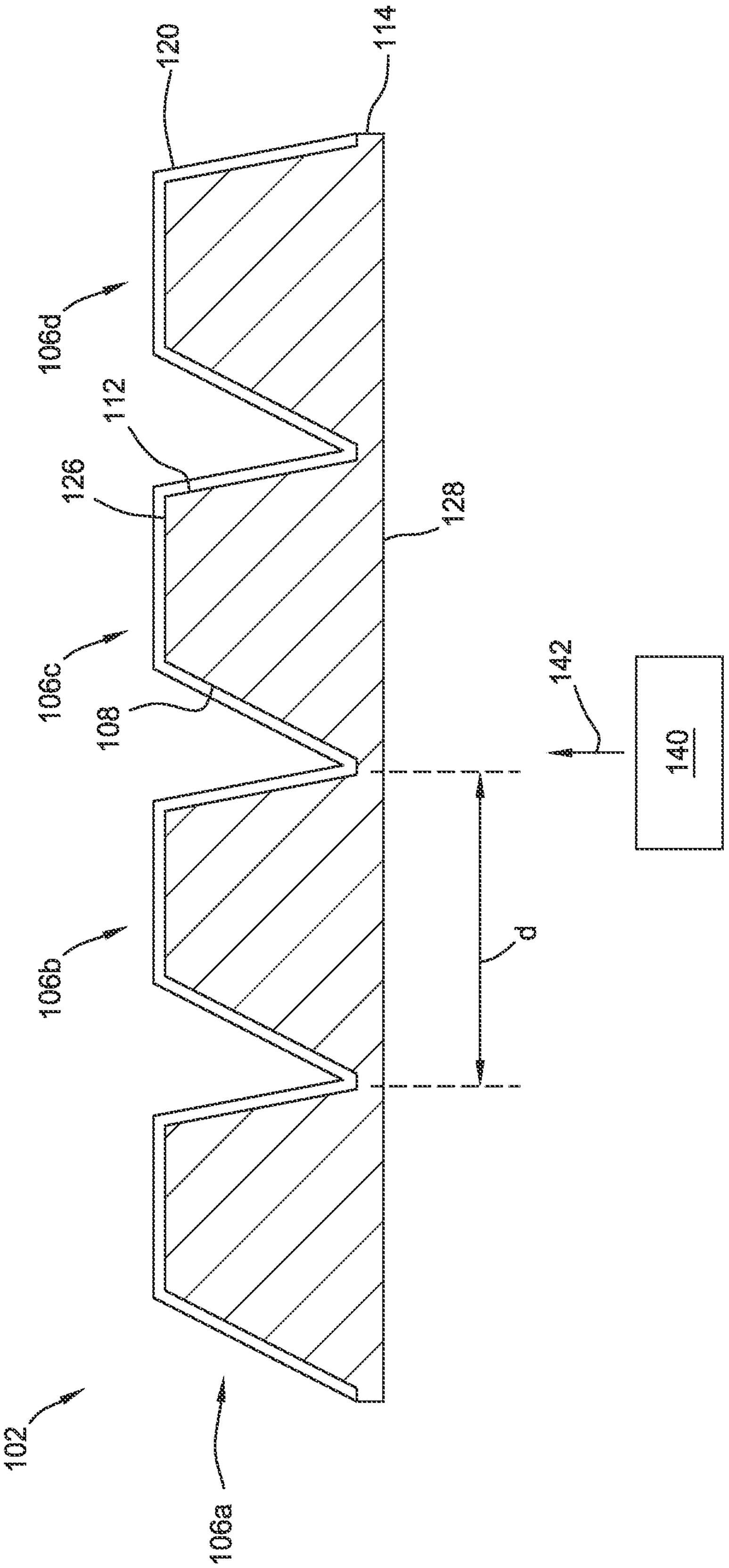
FIGS. 1B and 1C illustrate schematic, cross-sectional views of a plurality of grating structures according to one or more embodiments of the present disclosure.
Figure 1C:
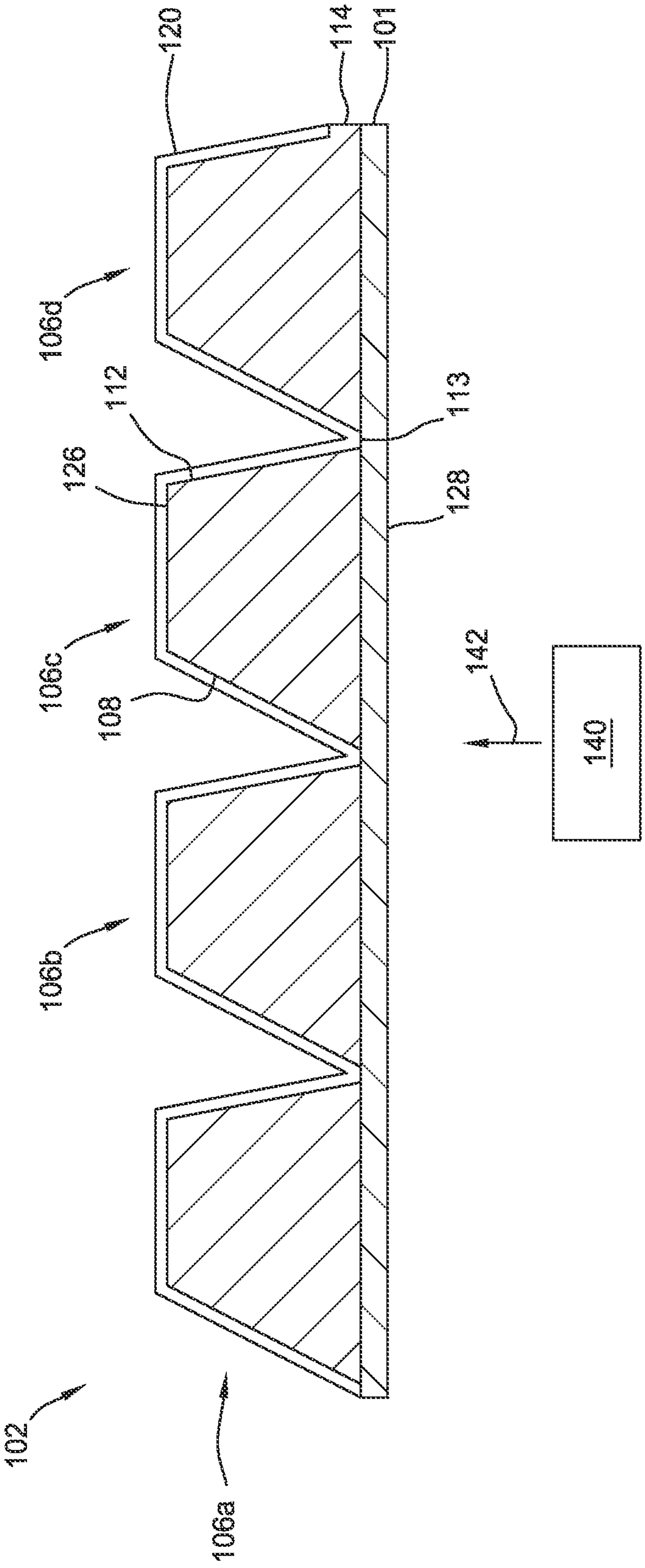

FIG. 1A illustrates a perspective, frontal view of a waveguide combiner 100 according to one or more embodiments of the present disclosure. It is to be understood that the waveguide combiner 100 described below is one exemplary waveguide combiner. In one embodiment, which can be combined with other embodiments described herein, the waveguide combiner 100 is an augmented reality waveguide combiner. The waveguide combiner 100 includes a plurality of grating structures 102 disposed on a substrate (as shown in FIG. 1C) or patterned directly into a substrate (as shown in FIG. 1B). The waveguide combiner 100 further includes a metal coating 120 disposed over the plurality of grating structures 102. As shown in FIG. 1B, the plurality of grating structures 102 are patterned directly into a substrate, for example, a substrate 101. As shown in FIG. 1C, the plurality of grating structures 102 are formed in a grating material layer 114 formed on a top surface 113 of the substrate 101. The grating structures 102 can be nanostructures having sub-micron dimensions, for example, nano-sized dimensions, such as critical dimensions less than 1 μm. In one embodiment, which can be combined with other embodiments described herein, regions of the grating structures 102 correspond to one or more gratings 104, such as a first grating 104*a*, a second grating 104*b*, and a third grating 104*c*.

In one embodiment, which can be combined with other embodiments described herein, the waveguide combiner 100 is a waveguide combiner that includes at least the first grating 104*a* corresponding to an input coupling grating and the third grating 104*c* corresponding to an output coupling grating. The waveguide combiner 100 according to the embodiment, which can be combined with other embodiments described herein, may include the second grating 104*b* corresponding to an intermediate grating.

FIG. 1B and FIG. 1C are schematic, cross-sectional views of the plurality of grating structures 102. In one embodiment, which can be combined with other embodiments described herein, the grating structures 102 are blazed structures 106*a*-106*d* (collectively 106). The method 200 and the method 400 described herein forms the blazed structures 106. In another embodiment, which can be combined with other embodiments described herein, the grating structures 102 are blazed structures 106 of a waveguide combiner, for example, the waveguide combiner 100. The waveguide combiner 100 according to one embodiment, which can be combined with other embodiments described herein, can include blazed structures 106 in at least one of the gratings 104.

Figure 1D:
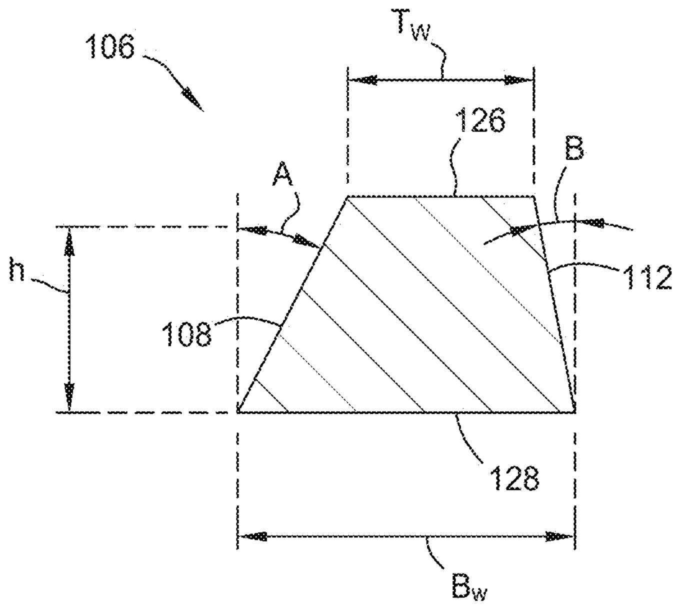
FIG. 1D illustrates a schematic, cross-sectional view of a blazed structure according to one or more embodiments of the present disclosure.

FIG. 1D illustrates a schematic, cross-sectional view of a blazed structure 106 according to one or more embodiments of the present disclosure. Referring to FIG. 1D, the blazed structure 106 includes a first blazed surface 108, a second blazed surface 112 opposite the first blazed surface 108, a top surface 126, a bottom surface 128 opposite the top surface 126, a grating depth "h," a top width "$T_w$", a bottom width "$B_w$," and a linewidth "d." The grating depth "h" can be from about 10 nanometers to about 500 nanometers; for example, from about 50 nanometers to about 80 nanometers; or from about 20 nanometers to about 40 nanometers. The first blazed surface 108 forms a blaze angle "A." The blaze angle "A" can be from about 50 degrees to about 80 degrees relative to perpendicular, for example, from about 60 degrees to about 70 degrees from perpendicular. The second blazed surface 112 forms a blaze angle "B." The blaze angle "B" can be from about 0 degrees to about 40 degrees from perpendicular, for example, from about 10 degrees to about 30 degrees from perpendicular. A top duty cycle is defined as (Top width $T_w$/grating period). The top duty cycle can be from about 0% to about 40%, for example, from about 10% to about 20%. A bottom duty cycle is defined as (Bottom width $B_w$/grating period). The bottom duty cycle can be from about 55% to about 100%, for example, from about 60% to about 80%.

In one embodiment, which can be combined with other embodiments described herein, the blaze angles "A" and/or "B" of two or more blazed structures 106 are different. In another embodiment, which can be combined with other embodiments described herein, the blaze angles "A" and/or "B" of two or more blazed structures 106 are the same. In one embodiment, which can be combined with other embodiments described herein, the depth h of two or more blazed structures 106 are different. In another embodiment, which can be combined with other embodiments described herein, the depth h of two or more blazed structures 106 are the same.

Referring to FIG. 1B, the linewidth "d" corresponds to the distance between the first blazed surfaces 108 of adjacent blazed structures 106. In one embodiment, which can be combined with other embodiments described herein, the linewidth "d" of two or more blazed structures 106 are different. In another embodiment, which can be combined with other embodiments described herein, the linewidths d of one or more blazed structures 106 are the same.

The substrate 101 may also be selected to transmit a suitable amount of light of a desired wavelength or wavelength range, such as one or more wavelengths from about 100 to about 3,000 nanometers. Without limitation, in some embodiments, the substrate 101 is configured such that the substrate 101 transmits greater than or equal to about 50% to about 100% of an IR to UV region of the light spectrum. The substrate 101 may be formed from any suitable material, provided that the substrate 101 can adequately transmit light in a desired wavelength or wavelength range and can serve as an adequate support for the blazed structures 106 (when the blazed structures 106 are formed in the grating material layer 114) described herein. Substrate selection may include substrates of any suitable material, including, but not limited to, amorphous dielectrics, non-amorphous dielectrics, crystalline dielectrics, silicon oxide, polymers, and combinations thereof. In some embodiments, which can be combined with other embodiments described herein, the substrate 101 includes a transparent material. Suitable examples can include an oxide, sulfide, phosphide, telluride or combinations thereof. In one example, the substrate 101 includes silicon (Si), silicon dioxide ($SiO_2$), germanium (Ge), silicon germanium (SiGe), sapphire, high-index transparent materials such as high-refractive-index glass, or a combination thereof. In some embodiments, which can be combined with other embodiments described herein, the substrate 101 includes a high refractive index grating material as described herein.

In some embodiments, which can be combined with other embodiments, the grating material layer 114 is a high refractive index grating material having a refractive index greater than or equal to 2.0. In some embodiments, which can be combined with other embodiments described herein, the grating material layer 114 includes, but is not limited to, one or more of silicon, silicon carbide (SiC), germanium, silicon oxycarbide (SiOC), titanium oxide ($TiO_x$), $TiO_x$ nanomaterials, titanium dioxide ($TiO_2$), vanadium (IV) oxide (VOx), aluminum oxide ($Al_2O_3$), aluminum-doped zinc oxide (AZO), indium tin oxide (ITO), tin dioxide ($SnO_2$), zinc oxide (ZnO), tantalum pentoxide ($Ta_2O_5$), silicon nitride $Si_3N_4$, silicon-rich ($Si_3N_4$), hydrogen-doped $Si_3N_4$, boron-doped $Si_3N_4$, hafnium oxide ($HfO_2$), scandium oxide ($Sc_2O_3$), zirconium dioxide ($ZrO_2$), niobium oxide ($NbO_x$), niobium oxide ($Nb_2O_5$), niobium-germanium ($Nb_3Ge$), cadmium stannate ($Cd_2SnO_4$), or silicon carbonnitride (SiCN) containing materials. In other embodiments, which can be combined with other embodiments described herein, the material of the grating material layer 114 has a refractive index of 2.0 or greater, for example, from about 2.0 to about 2.65, such as from about 2.0 to about 3.8. In other embodiments, which can be combined with other embodiments described herein, the material of the grating material layer 114 has a refractive index between about 3.5 and about 4.0.

The metal coating 120 is deposited on the top surface 126 of the plurality of grating structures 102. More specifically, the metal coating 120 is deposited on the top surface 126, the first blazed surface 108 and the second blazed surface 112 of the plurality of blazed structures 106 and on the top surface 113 (if exposed) of the substrate 101. The metal coating 120 can be of any suitable shape. In some embodiments, which can be combined with other embodiments, the metal coating 120 forms a conformal coating over or on the blazed structures 106. In other embodiments, which can be combined with other embodiments, the metal coating 120 forms a blanket coating or overfills the patterns defined by the blazed structures 106. The metal coating 120 has a thickness that is greater than the skin depth of the metal in the operating spectrum. In some embodiments, which can be combined with other embodiments described herein, the metal coating 120 has a thickness from about 10 nanometers to about 100 nanometers; for example, from about 50 nanometers to about 80 nanometers; or from about 20 nanometers to about 40 nanometers In some embodiments, which can be combined with other embodiments described herein, the metal coating 120 comprises, consists of, or consists essentially of one or more metals. The metal coating 120 includes but is not limited to transparent conducting materials (e.g., indium-tin-oxide (ITO), fluorine doped tin oxide (FTO), or doped zinc oxide), silver, aluminum, gold, or a combination thereof.

In one example, the blazed structure 106 includes the grating material layer 114 which is titanium oxide and the metal coating 120 is aluminum. The wavelength is 520 nanometers (green light), the grating period is 355 nanometers, the top width "$T_w$" is approximately 30 nanometers, the bottom width "$B_w$" is approximately 355 nanometers, the blaze angle "A" is 70 degrees, and the blaze angle "B" is 10 degrees.

As depicted in FIG. 1B and FIG. 1C, a microdisplay generator 140, which generates light 142 to form a virtual image in an image plane, can be positioned adjacent the substrate 101 (if present) as shown in FIG. 1C or adjacent to the bottom surface 128 as shown in FIG. 1B. The microdisplay generator 140 can be a liquid crystal on silicon image generator or other high resolution image generator. The light 142 generated by the microdisplay generator 140 is modulated by the plurality of grating structures 102.

Figure 2:
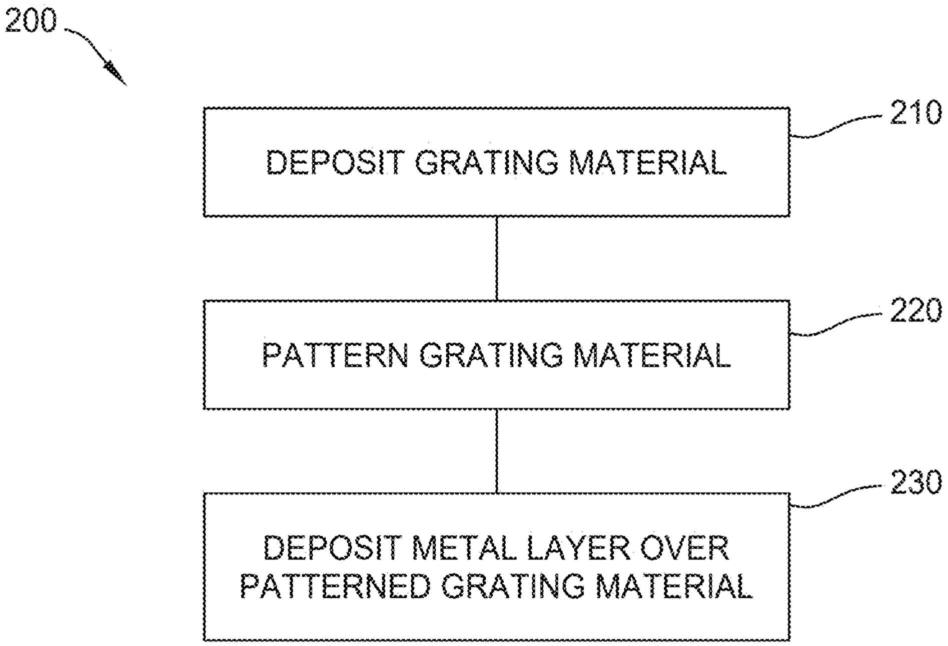
FIG. 2 illustrates a flow diagram of a method for fabricating a waveguide combiner according to one or more embodiments of the present disclosure.

FIG. 2 illustrates a flow diagram of a method 200 for fabricating a waveguide combiner, for example, the waveguide combiner 100 according to one or more embodiments of the present disclosure. FIGS. 3A-3E illustrate schematic cross-sectional view of various stages of fabrication of a waveguide combiner according to one or more embodiments of the present disclosure. Although operation of the method 200 is described in conjunction with FIGS. 3A-3E, persons skilled in the art will understand that any system configured to perform the method operations, in any order, falls within the scope of the embodiments described herein. The method 200 can be stored or accessible to a controller and/or secondary controller as computer readable media containing instructions, that when executed by a CPU of the controller and/or the secondary controller, cause a system to perform the method 200.

The method 200 begins at operation 210, where a grating material layer for example, the grating material layer 114 is deposited. The grating material layer 114 can be deposited on a substrate, for example, the substrate 101 if present. Any suitable method for deposition of the grating material layer 114 can be used. Examples of suitable thin film deposition methods include a physical vapor deposition (PVD) process (e.g., ion beam sputtering, magnetron sputtering, e-beam evaporation), a chemical vapor deposition (CVD) process, a plasma enhanced chemical vapor deposition (PECVD) process, an atomic layer deposition (ALD) process, an inkjet printing process, or a three-dimensional (3D) printing process.

Figure 3A:
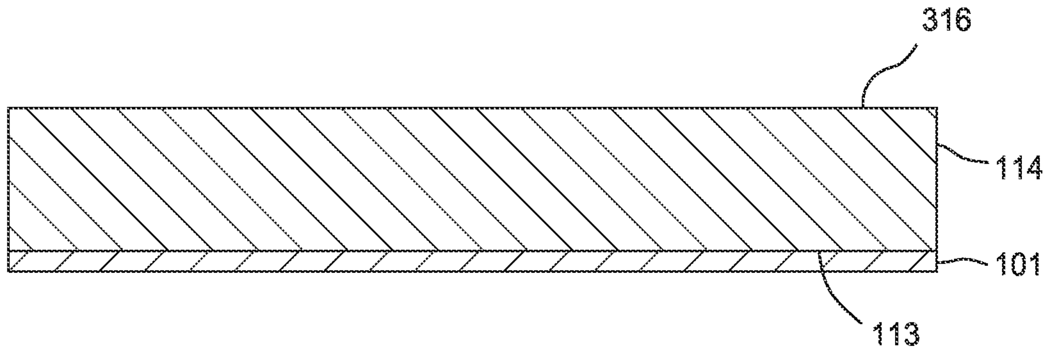
FIGS. 3A-3E illustrate schematic cross-sectional view of various stages of a waveguide combiner according to one or more embodiments of the present disclosure.
Figure 3B:
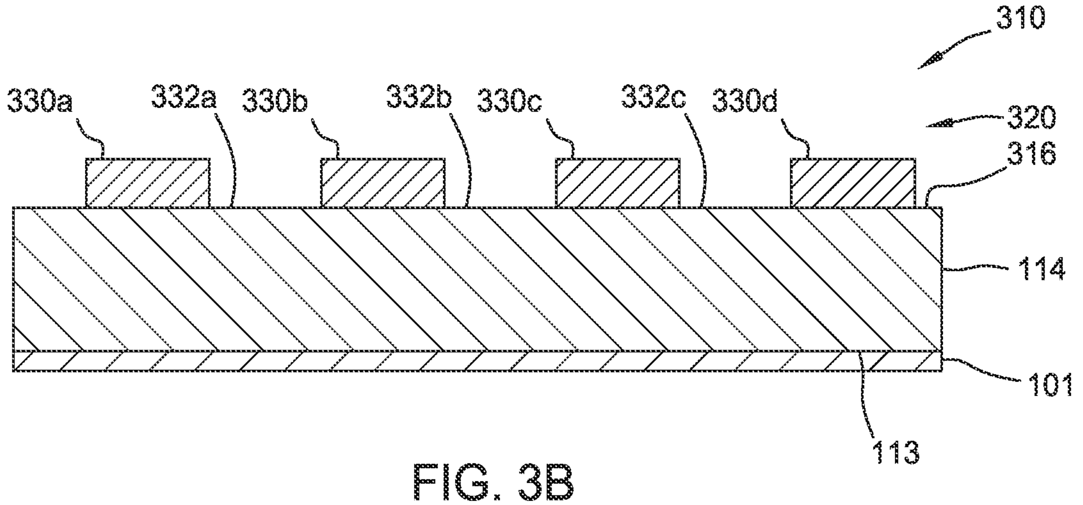

The method continues at operation 220, where the grating material layer 114 is patterned to form the blazed structures 106. Referring to FIG. 3B, a patterned resist 310 is formed over the grating material layer 114. The patterned resist 310 includes a resist material 320 that is patterned into a plurality of resist structures 330*a*-330*d* (collectively 330) disposed over a surface 316 of the grating material layer 114. The resist material 320 of the patterned resist 310 is selected based on the grating material layer 114 etch chemistry (in embodiments in which the grating material layer 114 is etched to form the blazed structures 106). In one embodiment, the resist material 320 is a photosensitive material such that the patterned resist 310 may be patterned by a lithography process, such as photolithography or digital lithography, or by laser ablation process to form the plurality of resist structures 330. In one embodiment, the resist material 320 is an imprintable material and the patterned resist 310 can be patterned by a nanoimprint process to form the plurality of resist structures 330. In another embodiment, which may be combined with other embodiments described herein, the resist material 320 is a hardmask material and the patterned resist 310 is patterned via one or more etch processes to form the plurality of resist structures 330. While only four resist structures 330*a*-330*d* and three exposed portions 332*a*-332*c* (collectively 332) of the surface 316 of the grating material layer 114 are shown, the entire patterned resist 310 can be etched such that a desired number of blazed structures 106 are formed depending on the predetermined design for the waveguide combiner 100.

Figure 3C:
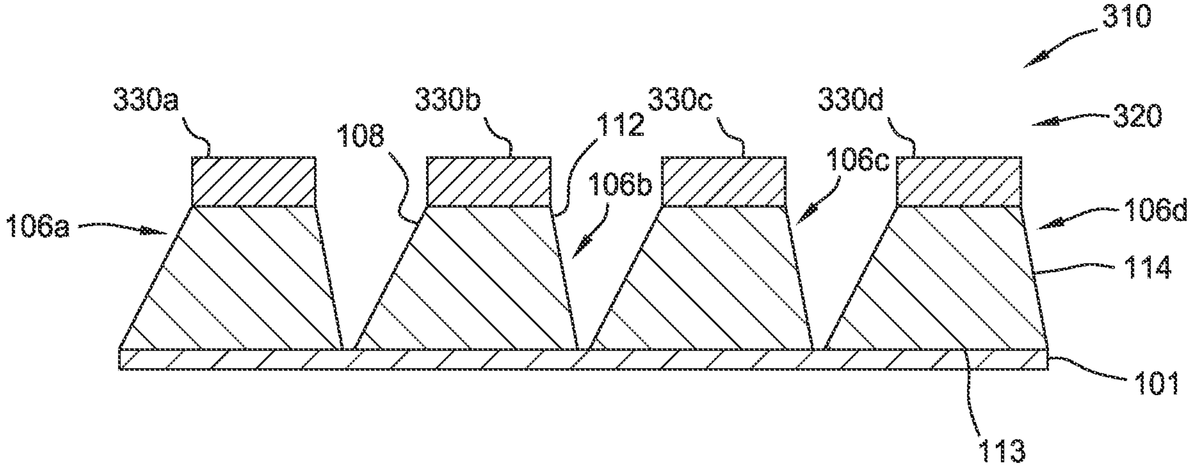
Figure 3D:
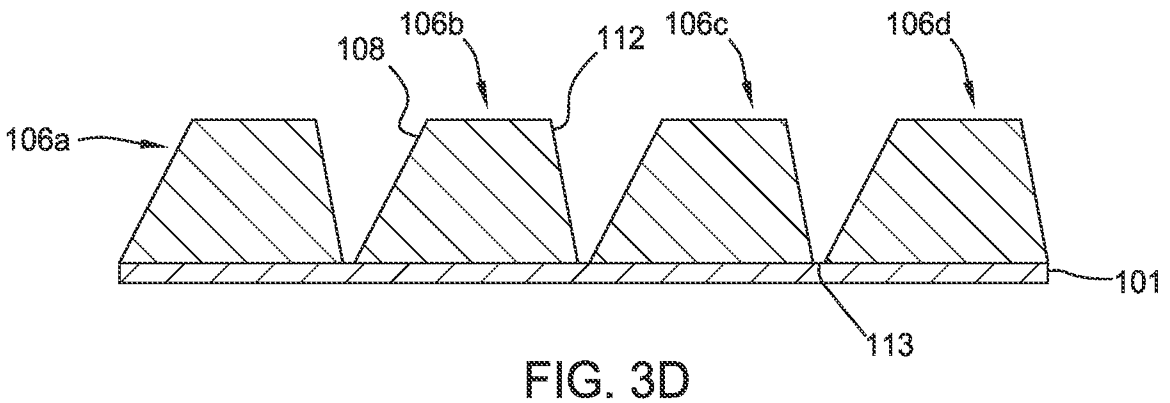

Operation 220 further includes directing an ion beam incident on the grating material layer 114. Operation 220 can include ion beam etching, focused ion beam etching, and the like. At operation 220, the grating material layer 114 is exposed to the ion beam at a beam angle relative to the surface normal of the grating material layer 114. In one embodiment, which can be combined with other embodiments described herein, the beam angle is about 10 degrees to about 80 degrees relative to the surface normal of the substrate 101. The beam has device etch chemistry that is selective to the resist structure 330, i.e., exposed portions 332 of the grating material layer 114 are removed at a higher rate than the resist structure 330. Referring to FIG. 3C, the beam etches the exposed portions 332 of the grating material layer 114 to form at least one of the first blazed surface 108 and the second blazed surface 112, which define the blazed structures 106. Then, the resist structure 330 is removed as shown in FIG. 3D.

Figure 3E:
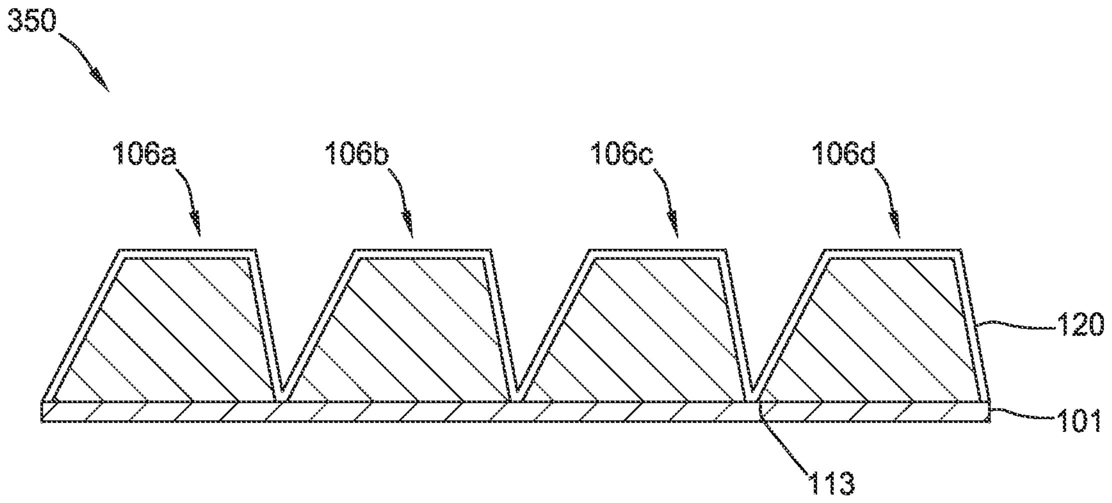

At operation 230, a metal coating 120 is formed over the blazed structures 106 to form a metallized high-index blazed grating structure 350 as shown in FIG. 3E. The metal coating 120 coats the exposed surfaces of the blazed structures 106. The metal coating 120 can be of any suitable shape. In some embodiments, which can be combined with other embodiments, the metal coating 120 forms a conformal coating over or on the blazed structures 106. In other embodiments, which can be combined with other embodiments, the metal coating 120 forms a blanket coating or overfills the patterns defined by the blazed structures 106. The metal coating 120 has a thickness that is greater than the skin depth of the metal in the operating spectrum.

Any suitable method for deposition of the metal coating 120 can be used. Examples of suitable thin film deposition methods include physical vapor deposition (PVD) (e.g., ion beam sputtering, magnetron sputtering, e-beam evaporation), chemical vapor deposition (CVD), plasma enhanced chemical vapor deposition (PECVD), atomic layer deposition (ALD), inkjet printing, or three-dimensional (3D) printing.

After operation 230, the metallized high-index blazed grating structure 350 can be subjected to additional processing.

Figure 4:
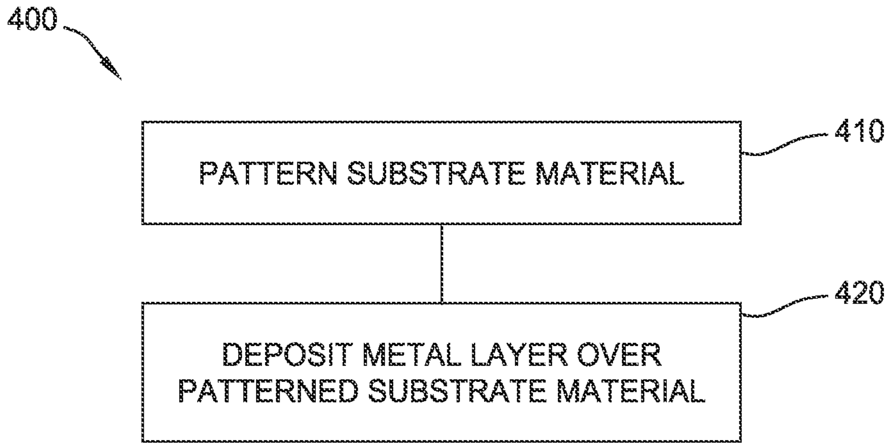
FIG. 4 illustrates a flow diagram of another method for fabricating a waveguide combiner according to one or more embodiments of the present disclosure.

FIG. 4 illustrates a flow diagram of another method 400 for fabricating a waveguide combiner according to one or more embodiments of the present disclosure. The method 400 is similar to the method 200 except that the plurality of blazed structures 106 are patterned into the substrate 101. FIGS. 5A-5E illustrate schematic cross-sectional view of various stages of a waveguide combiner according to the method 400.

Figure 5A:
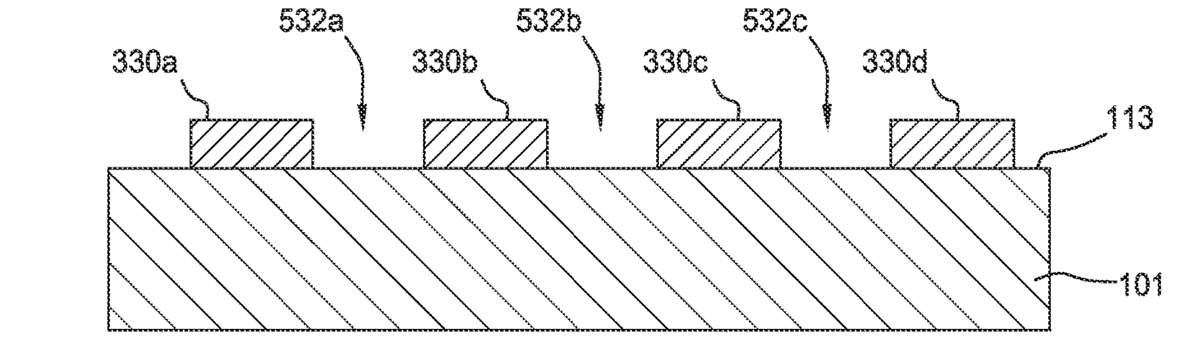
FIGS. 5A-5D illustrate schematic cross-sectional view of various stages of a waveguide combiner according to one or more embodiments of the present disclosure.
Figure 5B:
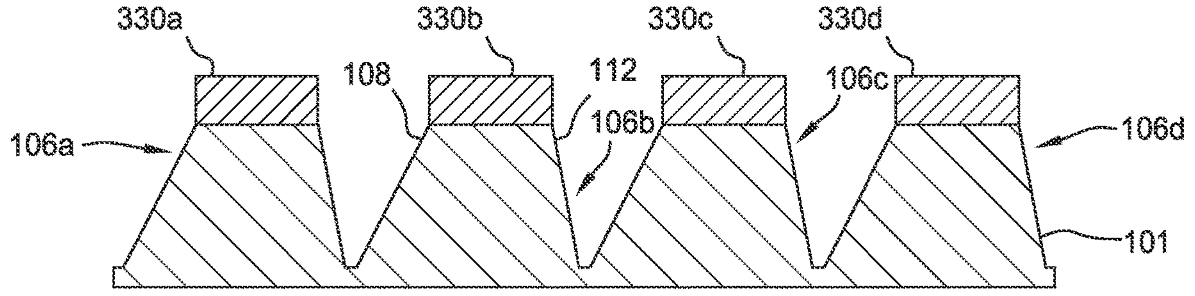
Figure 5C:
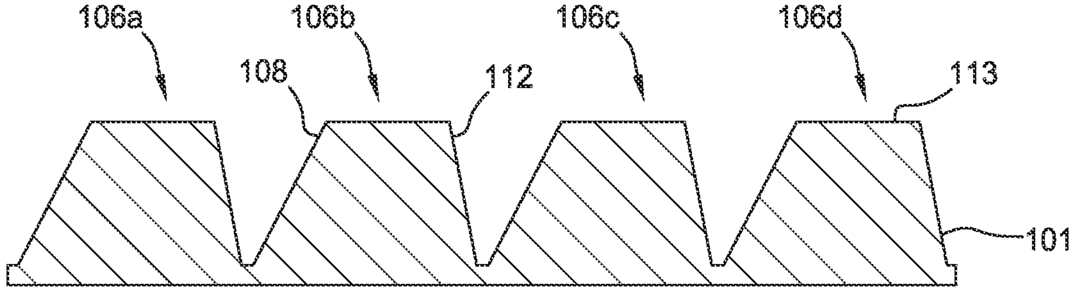

The method 400 begins at operation 410 where the substrate 101 is patterned to form the blazed structures 106. Referring to FIG. 5A, the patterned resist 310 is formed on the top surface 113 of the substrate 101. The patterned resist 310 exposes portions 532*a*-532*c* (collectively 532) of the top surface 113. Operation 410 further includes directing an ion beam incident on the exposed portions 532 of the substrate 101. Referring to FIG. 5B, the beam etches the exposed portions 332 of the substrate 101 to form at least one of the first blazed surface 108 and the second blazed surface 112, which define the blazed structures 106. Then, the resist structure 330 is removed as shown in FIG. 5C.

Figure 5D:
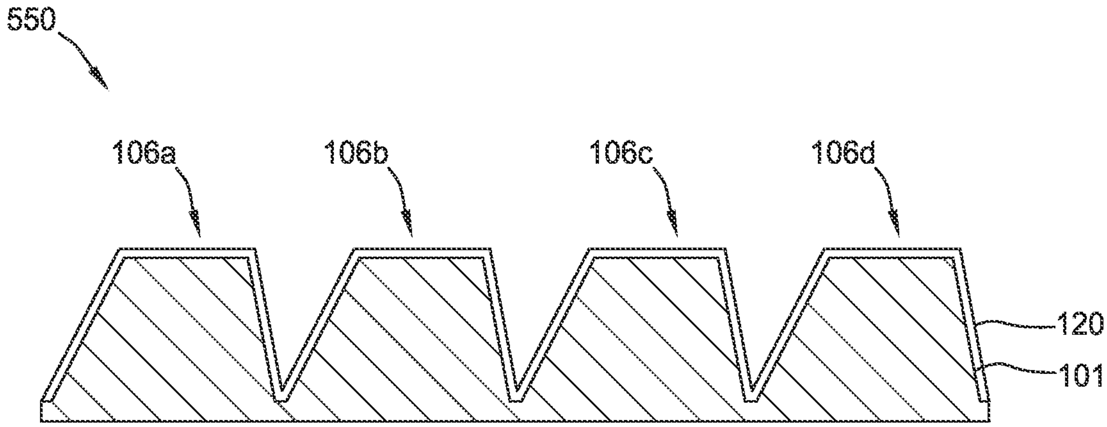

At operation 420, the metal coating 120 is formed over the blazed structures 106 to form a metallized blazed grating structure 550 as shown in FIG. 5D. After operation 420 the metallized blazed grating structure 550 can be subjected to additional processing.

In summation, metal-coated high refractive index material (n>=2.0) blazed gratings and methods of forming the same are provided. These metal-coated high refractive index material blazed gratings can be used as, for example, an input coupling grating, with high incoupling efficiency and high image quality of waveguide display, which can be quantified by measurement of optical efficiency, stray light, and ghost image. The high refractive index material can support higher average diffraction efficiency, which can lead to higher incoupling efficiency. The high refractive index material can support more uniform (flatter) angular diffusion of efficiency, which leads to higher brightness uniformity. In addition, these metal-coated high-index material blazed gratings can improve optical efficiencies for large incident angles, so that the FOV can be enlarged as well.

Embodiments and all of the functional operations described in this specification can be implemented in digital electronic circuitry, or in computer software, firmware, or hardware, including the structural means disclosed in this specification and structural equivalents thereof, or in combinations of them. Embodiments described herein can be implemented as one or more non-transitory computer program products, i.e., one or more computer programs tangibly embodied in a machine readable storage device, for execution by, or to control the operation of, data processing apparatus, e.g., a programmable processor, a computer, or multiple processors or computers.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. Processors suitable for the execution of a computer program include, by way of example, both general and special purpose microprocessors, and any one or more processors of any kind of digital computer.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

When introducing elements of the present disclosure or exemplary aspects or embodiment(s) thereof, the articles "a," "an," "the" and "said" are intended to mean that there are one or more of the elements.

The terms "comprising," "including" and "having" are intended to be inclusive and mean that there may be additional elements other than the listed elements.

While the foregoing is directed to embodiments of the present disclosure, other and further embodiments of the disclosure may be devised without departing from the basic scope thereof, and the scope thereof is determined by the claims that follow.

The invention claimed is:

1. A waveguide, comprising:

a plurality of blazed structures disposed along at least one of at an input coupling region or an output coupling region of the waveguide, the plurality of blazed structures comprising:

a grating material layer comprising a grating material having a refractive index greater than or equal to 2.0; and a coating deposited directly on a patterned surface of the grating material layer via at least one of a physical vapor deposition (PVD) process, a chemical vapor deposition (CVD) process, a plasma enhanced chemical vapor deposition (PECVD) process, or an atomic layer deposition (ALD) process, wherein:

the grating material is selected from titanium dioxide, silicon, silicon dioxide, silicon nitride, niobium oxide, or a combination thereof, the coating consists of silver, aluminum, or a combination thereof, each of the plurality of blazed structures comprises a first blaze angle and a second blaze angle, the first blaze angle is between 50 degrees to 80 degrees from perpendicular, the second blaze angle is between 0 degrees and 40 degrees from perpendicular, a thickness of the coating is between 20 nanometers (nm) and 40 nm, a top duty cycle of the plurality of blazed structures ranges from 10% to 20%, and a bottom duty cycle of the plurality of blazed structures ranges from 60% and 80%.

2. The waveguide of claim 1, wherein the coating conformally coats the grating material layer.

3. The waveguide of claim 1, wherein the coating forms a blanket coating on the grating material layer.

4. The waveguide of claim 1, further comprising a microdisplay positioned adjacent a bottom surface of the grating material layer, wherein the bottom surface is opposite the patterned surface.

5. The waveguide of claim 1, wherein the coating has a thickness that is greater than a skin depth of the coating at an operating wavelength.

6. The waveguide of claim 1, wherein the coating has a thickness from 10 nanometers to 100 nanometers.

7. The waveguide of claim 1, wherein the grating material has a refractive index from 2.0 to 3.8.

8. The waveguide of claim 1, wherein the grating material has a refractive index from about 3.5 to about 4.0.

9. The waveguide of claim 1, further comprising a microdisplay generator configured to generate light to form a virtual image in an image plane.

10. The waveguide of claim 9, wherein the microdisplay generator is a liquid crystal on silicon (LCOS) image generator.

11. The waveguide of claim 1, wherein the plurality of blazed structures and the coating are configured to reduce back-diffraction of light toward a light engine.

12. The waveguide of claim 1, wherein the plurality of blazed structures and the coating are configured to reduce stray light and ghost image.

13. The waveguide of claim 1, wherein the plurality of blazed structures and the coating are configured to increase a field of view of the waveguide.

14. A method of forming a waveguide, comprising:
- forming a plurality of blazed structures along at least one of at an input coupling region or an output coupling region of the waveguide, comprising:
  - depositing a layer of a grating material having a refractive index greater than or equal to 2.0;
  - patterning the layer of the grating material to form a patterned surface; and
  - depositing a metallic coating consisting of a metal directly on the patterned surface via at least one of a physical vapor deposition (PVD) process, a chemical vapor deposition (CVD) process, a plasma enhanced chemical vapor deposition (PECVD) process, or an atomic layer deposition (ALD) process, wherein:
    - the grating material is selected from titanium dioxide, silicon, silicon dioxide, silicon nitride, niobium oxide, or a combination thereof,
    - the metallic coating consists of silver, aluminum, or a combination thereof,
    - each of the plurality of blazed structures comprises a first blaze angle and a second blaze angle,
    - the first blaze angle is between 50 degrees to 80 degrees from perpendicular,
    - the second blaze angle is between 0 degrees and 40 degrees from perpendicular,
    - a thickness of the coating is between 20 nanometers (nm) and 40 nm,
    - a top duty cycle of the plurality of blazed structures ranges from 10% to 20%, and
    - a bottom duty cycle of the plurality of blazed structures ranges from 60% and 80%.

15. The method of claim 14, wherein patterning the layer of the grating material comprises performing a nanoimprint process.

16. The method of claim 15, wherein the nanoimprint process comprises:
- depositing a resist on the layer of the grating material;
- patterning the resist to expose portions of the grating material; and
- etching through the exposed portions of the grating material.

17. The method of claim 16, wherein etching through the exposed portions of the grating material comprises directing an ion beam incident on the exposed portions of the grating material.

18. The method of claim 14, wherein patterning the layer of the grating material comprises performing a photolithography process.

* * * * *